June 11, 1946.  H. C. DRAKE  2,401,917
SHELL BANDING TESTER
Filed March 14, 1944
Fig.1.
Fig.2.
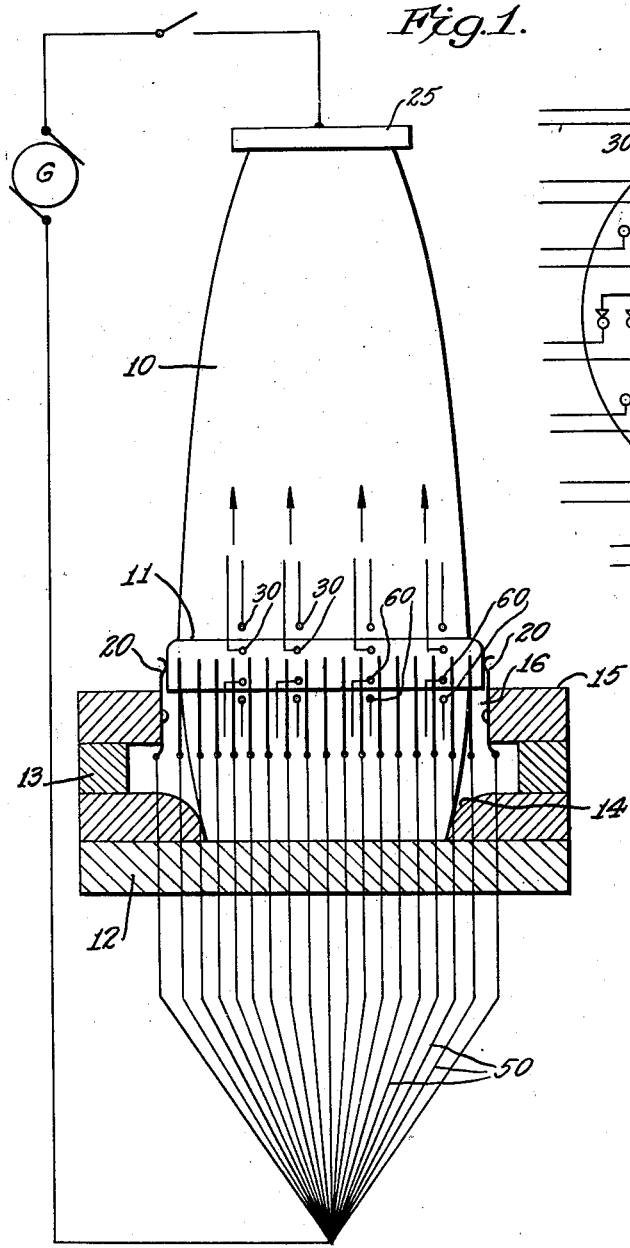
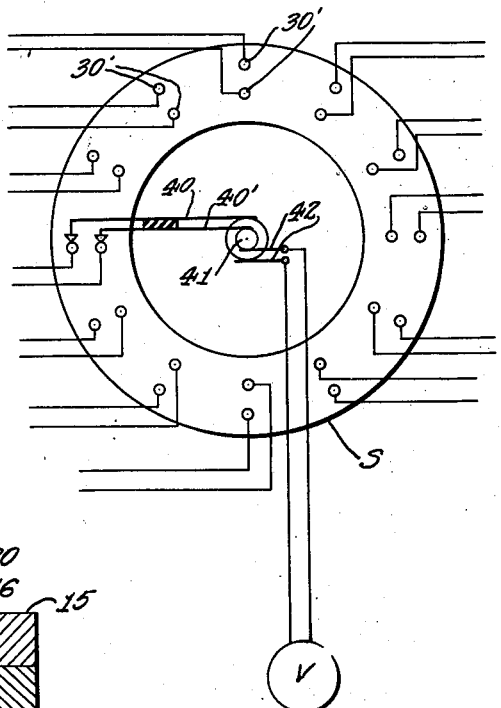
INVENTOR.
HARCOURT C. DRAKE
BY
*Joseph H. Lipschutz*
ATTORNEY Patented June 11, 1946

2,401,917

UNITED STATES PATENT OFFICE 2,401,917

SHELL BANDING TESTER

Harcourt C. Drake, Hempstead, N. Y., assignor to Sperry Products, Inc., Hoboken, N. J., a corporation of New York Application March 14, 1944, Serial No. 526,453

1 Claim. (Cl. 175—183)

This invention relates to an arrangement for testing shell banding, i. e., the degree of firmness with which a band, usually of copper, has been fastened in the groove provided therefor in the periphery of a shell near the rear end thereof. It is well known that unless such banding is perfect, that is, unless there are no air gaps between the band and the shell, the performance of the shell will be seriously interfered with due to reduced muzzle velocity, and therefore, reduced range. Various means have been proposed for testing the efficiency of the banding in the groove provided therefor, but none of these has proved effective, and on the contrary, they have drastically reduced the rate of output and resulted in a substantial degree of inefficiency due to discarding of shells which were properly banded. Thus, for example, one proposed method consisted in taking as a sample, one shell in each two thousand and measuring the overall diameter of the outside of the banded portion of the shell, then breaking the band and separately measuring the diameter of the shell in the grooved part plus the thicknesses of the band portions which engage the groove. If the addition of these factors showed a result less than the outside measurement of the band, there was indication of an air gap. This method, however, had many disadvantages, first because the measurements were in a range beyond the capacity of the instruments to detect them with the necessary degree of accuracy, and secondly, even if by this method a defective shell was found, it resulted in the elimination of an entire heat of some two thousand shells, many of which were probably well banded.

Up to the time of applicant's proposed solution, therefore, there was no efficient, quick, reliable and inexpensive method of testing the banding. It is therefore one of the principal objects of this invention to provide a novel method and means for quickly, efficiently and inexpensively testing the efficiency of banding between the metal bands and the grooved portions of the shells which they surround.

Further objects and advantages of this invention will become apparent in the following detailed description thereof:

In the accompanying drawing,

Fig. 1 is a front elevation, partly sectioned vertically and partly diagrammatic, showing the application of my testing system to a banded shell.

Fig. 2 is a view consisting largely of an electric wiring diagram showing the electric wiring of the selector switch mechanism.

Referring to Fig. 1 of the drawing, there is shown a shell 10 having a band 11 pressed firmly into engagement therewith within a groove provided within the periphery of the shell 10 in the well-known manner. The functions performed by these bands are well known, and it is also well known that if these bands are not in firm engagement throughout the entire periphery with the grooved portion of the shell, there will be a sharp reduction in muzzle velocity and range of firing, and, therefore, a general lowering of efficiency with frequently dangerous consequences.

For the purpose of testing the degree of banding between the band 11 and the grooved portion of the shell 10, I have provided the following arrangement:

The shell is designed to be held in a base or holder 12 having a portion 13 with a central opening 14 designed to direct the lower end of the shell into testing position. The opening 14 is such that the lower end of the shell fits snugly. When in position on base 12 within the opening 14, the shell is surrounded by a member 15 having an opening 16 concentric with the shell, and in said opening the member 15 is provided with a plurality of spring contact brushes or fingers 20. In the view shown, there are eighteen such fingers, but it will be understood that these fingers completely surround the shell, and in this instance, would comprise thirty-six such contact fingers or brushes. Each finger is in the form of a spring member designed to engage the central portion of the band 11 when the shell is in testing position on base 12. Current supplied to these fingers is designed to pass into the band, and thence into the shell toward the upper end thereof, the current leaving by way of a plate 25 which is an electrode attached to the upper end of the shell which, as will be understood, at this time is without its fuse cap. The current supplied from a generator G therefore passes into fingers or brushes 20, thence into the shell 10 and out by way of electrode plate 25 to return to the generator G. Current therefore flows longitudinally of the shell and follows the contour of the shell.

If the banding on the shell 10 is perfect, that is, if there is no air gap between the band and the shell, the potential drop between the band and the shell in the direction of current flow indicated by the arrows will be relatively small. However, if there is an air gap, the resistance is increased and the voltage drop will be relatively high. This voltage drop may be measure by a plurality of pairs of potential contacts 30, each pair positioned with one contact on the band and the other contact on the shell adjacent the band, the pair of contacts being arranged in the line of current flow indicated by the arrow. As many pairs of contacts may be provided around the periphery of the band and shell as are necessary to cover the circumference completely. In the case shown, twelve pairs of potential contacts are employed as against the thirty-six current fingers or brushes. The pairs of contacts may be carried by any suitable support, not shown, which may be moved toward and away from the band and shell, but so constructed that when the support is in effective position, one contact of each pair will engage the band beyond the current brushes, and the other contact of each pair will be in engagement with the shell in the line of current flow.

In determining whether there is an air gap between the band and the shell, comparison may be made between the voltage drop recorded by contact fingers in the case of a shell known to be perfectly banded, and the potential drop in the case of the test shell. Thus, if it is known that a band which is perfectly banded to its shell gives a voltage drop of .2 millivolt, a voltage drop considerably in excess of this value will indicate the presence of an air gap.

For facilitating the testing of the entire periphery of the band quickly, the connections from each pair of contacts 30 may be led to a corresponding pair of contacts 30' on a selector switch mechanism S having a pair of rotating contacts 40, 40', designed to engage the respective contacts of each pair simultaneously, and adapted to engage each successive pair as the contact is rotated around its center 41. The voltage drop may be taken off by means such as brushes 42 and led to a voltmeter V. Thus, by merely swinging the contact arm 40, 40' around in a complete circle and stopping at each pair of contacts, the voltage drop between each pair of contacts 30 can be read on the voltmeter V.

The provision of the multiplicity of current fingers or brushes 20 instead of a single, circular electrode engaging the band 11 is important in the operation of the device. If a single, circular brush engaged the band 11, the resistance drop between the circular brush and the band would be small, and if a particle of dirt, grease or other foreign matter were present at any one point between the circular contact and the band 11, there would be a sharp variation in the current at that point, which would give a very marked increase in voltage drop across the particular set of contacts 30 in that region. However, by employing a plurality of current brushes or fingers as shown, and making each brush part of a relatively long lead 50 having relatively large resistance, it will be seen that the increase in resistance due to a bit of dirt or grease lodging beneath the particular current finger would result in a relatively small variation in the current, and therefore in a relatively small variation in the current drop which would be picked up by the respective pair of contacts 30. Thus, by this method there is eliminated one major source of false indications which would otherwise make this method of testing impractical.

While the bulk of the current will pass from band 11 to the electrode 25 through the forward edge of the band, a relatively small amount of current will pass from said band to the electrode 25 by way of the rear edge of the band, that is, the current will pass into the shell by way of the rear edge of the band and reverse itself in order to travel to the electrode 25. This gives an opportunity to detect any defects in banding at the rear part of the band although the voltage drop will be of a relatively smaller degree because of the relatively smaller amount of current. Therefore, another series of pairs of contacts 60 may be provided, each pair having one contact on the band adjacent its rear edge with another contact on the shell to the rear of the rear edge. This is in contrast with the pairs of contacts 30 wherein one contact of each pair is positioned on the band adjacent the forward or front end thereof with another contact of each pair on the shell to the front of the band adjacent thereto.

A second selector switch similar to S may be provided for the series of contacts 60, and will operate in the same manner as the selector switch S in connection with the series of contacts 30.

The arrangement described hereinbefore enables the shell to be tested while in stationary position. However, if facilities are provided for rotating the shell around its longitudinal axis, then it will be understood that only a single contact brush 20, a single pair of contacts 30 and a single pair of contacts 60 need be employed. The rotation of the shell around its longitudinal axis will permit the testing of the entire circumference of the band. In such case, it will not be necessary to employ selector switches, since each pair of contacts can be connected directly to a voltmeter or other indicating instrument.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having thus described my invention, what I claim and desire to secure by Letters Patent is:

In a testing device, a shell having a metal band, an electrode engaging said shell, a plurality of current brushes in engagement with the band and angularly displaced around the circumference of the band, a source of current having one terminal connected to said electrode and having the other terminal connected to said plurality of brushes by leads whose resistance is high relative to the variations in resistance contact between the brushes and the band, and means responsive to the drop in potential between the band and the shell.

HARCOURT C. DRAKE.